June 23, 1970 W. R. WEAVER 3,516,736
FOCUSSING OBJECTIVE FOR TELESCOPE SIGHTS
Filed Jan. 16, 1967
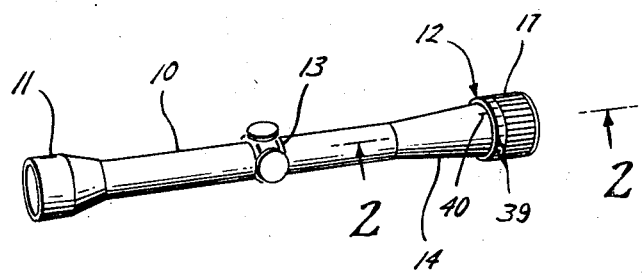
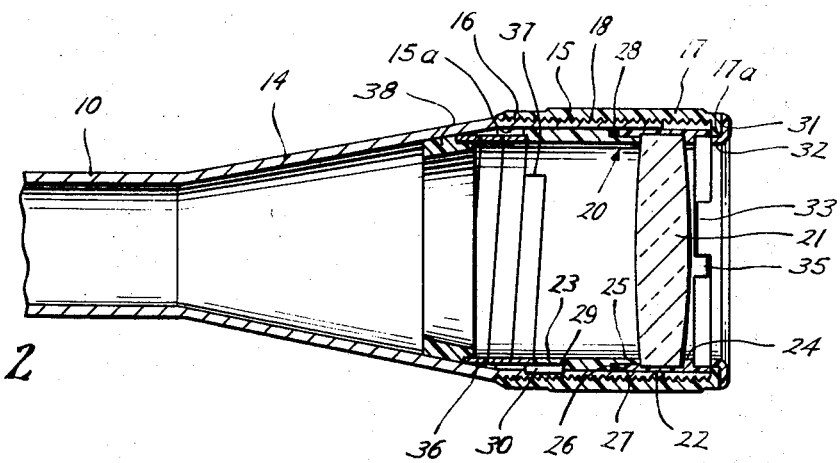
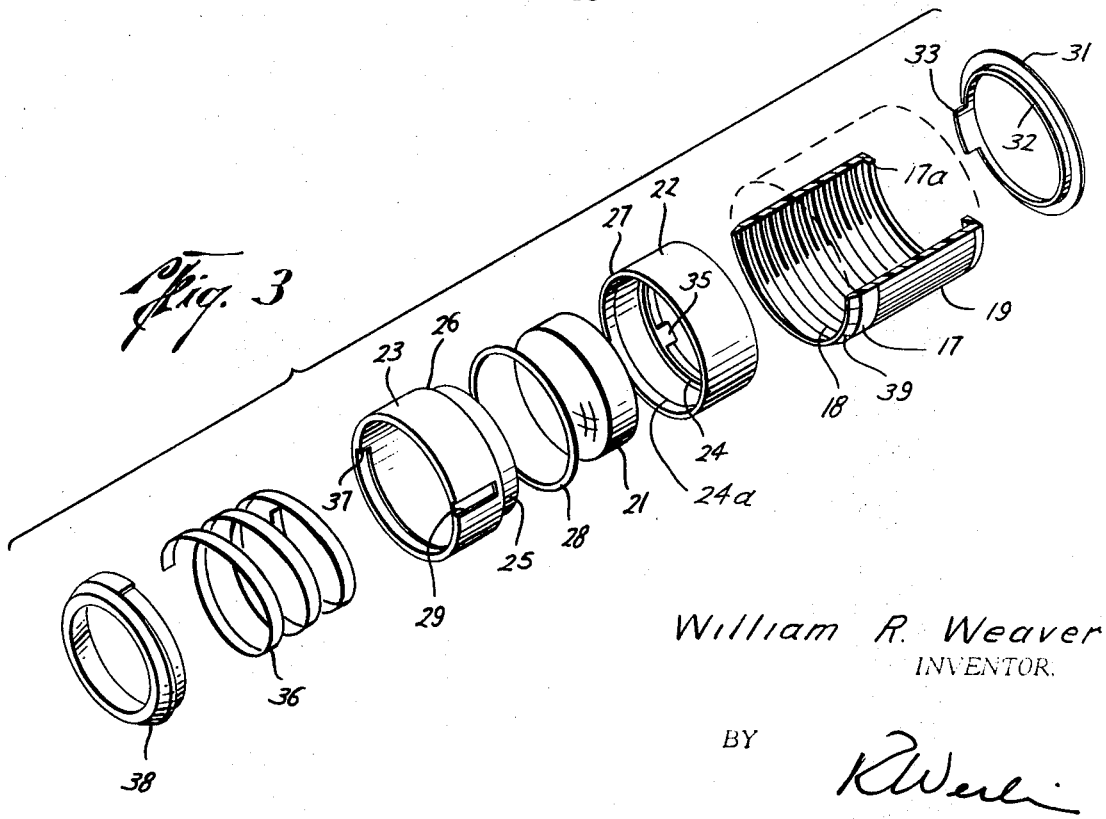
William R. Weaver
INVENTOR.
BY
ATTORNEY

United States Patent Office 3,516,736
Patented June 23, 1970

3,516,736
FOCUSSING OBJECTIVE FOR TELESCOPE SIGHTS
William R. Weaver, El Paso, Tex., assignor to W. R. Weaver Company, El Paso, Tex., a corporation of Texas
Filed Jan. 16, 1967, Ser. No. 609,488
Int. Cl. G02b 7/02
U.S. Cl. 350—255                                    6 Claims

ABSTRACT OF THE DISCLOSURE

A focussing objective for telescope sights for firearms employing a slidable lens cell and a threaded drive collar for urging the lens cell in one direction in opposition to a biasing means urging the lens cell in the opposite direction.

BACKGROUND OF THE INVENTION

This invention relates to telescope sights and more particularly to improvements in focussing objectives for such sights.

In conventional target-type telescope sights for firearms for use where extreme accuracy in target shooting and hunting is desired and shooting is apt to be done at extreme range variances, mechanisms are provided in the telescope sight ("scope") to allow in-the-field adjustment of the lens system to focus the sighted object on the reticle at whatever distance the object is viewed, to thereby eliminate parallax and other sources of inaccuracy in aiming. That adjustment is usually accomplished by rearward or forward movement of the objective lens to cause a corresponding rearward or forward movement of the image into the plane of the reticle.

In scopes equipped with the more conventional forms of focussing objectives, the mechanisms generally comprise a relatively large number of parts, slot-and-pin connections between the lens cell and the actuating device, mechanical arrangements, and locking rings which, in general, involve rather difficult assembly and ineffective sealing of the scope parts against entrance of moisture and dust.

The present invention has for its primary object an improved design for a focussing objective employing a lesser number of parts than required by more conventional designs and obviating or eliminating the deficiences of existing designs such as those outlined above.

SUMMARY OF THE INVENTION

Generally stated, and in accordance with this invention, the improved design comprises in combination with a scope tube or barrel having an externally or internally threaded forward end, a threaded actuating collar mounted to cooperate with the threaded end of the barrel, a sleeve member carrying the objective lens non-rotatably but slidably mounted in the forward end of the scope barrel, drive means carried by the forward end of the actuating collar extending inwardly of the forward end of the scope barrel into thrusting engagement with the forward end of the sleeve member whereby to urge the latter axially inwardly in response to rotation of the actuating collar in one direction, and spring means inside the scope barrel biasing the sleeve member in the opposite direction to cause it to follow the axial movement of the actuating collar produced by the rotation of the latter in the opposite direction. A seal means, such as an O-ring seal, is disposed between the sleeve member and the scope barrel rearwardly of said drive means whereby to effectively seal-off the interior of the scope barrel against entrance of moisture, dust and the like.

Other and more specific objects and advantages of this invention will become more readily apparent from the following detailed description when read in conjunction with the accompanying drawing which illustrates one useful embodiment in accordance with this invention.

In the drawing:

FIG. 1 is a perspective elevational view of a telescope sight employing a focussing objective in accordance with this invention.

FIG. 2 is a longitudinal sectional view taken along line 2—2 of FIG. 1; and

FIG. 3 is an exploded perspective view, partly in section, illustrating the details of the parts comprising the focussing objective.

Referring first to FIG. 1, there is illustrated a telescope sight of generally conventional form comprising a tubular barrel 10, an ocular portion 11, at one end, and an objective portion, designated generally by the numeral 12, at the other end. It will be understood that the scope will be equipped with other well-known and generally conventional elements, including a sighting reticle, adjustable erector system, and other optical and mechanical elements which are not illustrated as they do not form a part of the present invention. Barrel 10 is shown as fitted with a turret 13 bearing the usual windage and elevation adjustment screws for moving the internal optical system, likewise conventional but not forming a part of this invention.

Accordingly, it will be understood that the focussing objective in accordance with this invention, to be described in detail hereinafter, is intended for use with telescope sights wherein the parts, other than the focussing objective, may be of designs which vary widely in accordance with known constructions.

In the exemplary embodiment of FIG. 1, barrel 10 is provided at its forward end with an integral conically diverging segment 14 terminating at its forward end in a cylindrical portion 15 having a bore 15a and larger in diameter than barrel 10. Portion 15 is provided with a section of external threads 16.

An actuating or focussing collar 17 is mounted about cylindrical portion 15 and is provided with internal threads 18 matching threads 16, so that rotation of collar 17 will axially advance or retract the collar relative to portion 15 in accordance with the direction of rotation of the collar. The exterior of collar 17 may be provided with longitudinal ridges 19 or other suitable and conventional form of knurling or roughening to aid in gripping the collar in order to turn it on threads 16.

A sleeve member, designated generally by the numeral 20, is mounted in bore 15a for axial non-rotative movement therein. Sleeve member 20 provides the movable support or cell for the objective lens 21, which may be of any well-known and generally conventional form. In the illustrative embodiment, sleeve member 20 is of two-part telescoping construction comprising a forward sleeve portion 22 and a rearward sleeve portion 23.

Forward sleeve portion 22 is provided inwardly of its forward end with an internal annular shoulder 24, the inner face of which serves as an abutment against which lens 21 is seated. A second internal shoulder 24a is provided in the bore of portion 22 spaced inwardly from its rearward end. Rearward sleeve portion 23 is provided with a reduced diameter, annular tongue 25 at its forward end adapted to be telescopically received in the rearward end of forward sleeve portion 22 to bear against shoulder 24a. The length of tongue 25 is made slightly greater than the distance between shoulder 24a and the rearward end of sleeve portion 23. The reduction in external diameter forming tongue 25, defines an external shoulder 26 about sleeve portion 23 which, when the latter is inserted in sleeve portion 22 and by reason of the difference in length between tongue 25 and the distance to shoulder 24a, will be spaced from the rearward end of sleeve portion 22 to define therewith an external groove 27 about sleeve member 20 adapted to receive a seal ring 28, such as a conventional flexible O-ring, which will serve to provide an effective air-tight seal between sleeve member 20 and the wall of bore 15a, while permitting axial movement of the sleeve member in bore 15a. Rearward sleeve portion 23 is provided in its exterior with a longitudinal groove 29 adapted to receive a spline or key 30 projecting from the wall of bore 15a adjacent its rearward end. Key 30 and groove 29 define a spline arrangement permitting axial movement of the sleeve member in bore 15a while preventing rotation of the sleeve member therein. Collar 17 is provided at its forward end with a radial inwardly projecting annular flange 17a which overhangs the forward end of portion 15 and forms a stop limiting forward movement of sleeve member 20. An end ring 31 is secured to the forward end of collar 17 and flange 17a and is provided with an inwardly projecting annular flange 32 which fits snugly within the bore of flange 17a. Projecting inwardly from flange 32 toward shoulder 24 is a short arcuate lug 33. Flange 17a and the forward end of sleeve member 20 function as cooperating drive means for moving the sleeve member 20 axially inwardly of the scope tube in accordance with the rotations of actuating collar 17 in the retractive direction. Shoulder 24 is provided with a narrow forwardly projecting stop lug 35 disposed to be engageable with lug 33 to limit the maximum angular movement of the latter in either direction to slightly less than a complete rotation, for purposes to be described more fully hereinafter. A coil spring 36 has one end bearing against an internal seat 37 formed in the rearward end of rearward sleeve portion 23 and its opposite end mounted in a seat ring 38, of generally conical configuration, adapted to bear against the tapered bore of tube segment 14. Spring 36 will thus be disposed in compression between seat ring 38 and the rearward end of sleeve member 20 and will function to continuously bias the latter forwardly in the scope tube to maintain the forward end of sleeve member 20 in continuous firm engagement with flange 17a.

A plurality of calibrations 39 and appropriate indicia are marked on the rearward end of collar 17 for positioning opposite an index mark 40 disposed on tube segment 14 adjacent the rearward end of the actuating collar. Calibrations 39 will be made to indicate the different distances at which the objective will be focussed as determined by the angular movement of the actuating collar relative to index mark 40.

In operation, with the objective elements assembled in the manner illustrated in FIG. 2, it will be seen that rotation of collar 17 in one direction will cause flange 17a to move inwardly thrusting against the forward end of cell 22 as it slides angularly thereon, and urging sleeve member 20 inwardly in accordance with the degree of axial movement of collar 17. This inward movement will be opposed by the force of spring 36, which will serve to keep the objective lens cell in tight engagement with flange 17a as the latter rotates about the end of cell 22. To adjust the focus of the objective in the opposite direction, collar 17 will be rotated in the opposite direction, the force of spring 36 being effective to bias sleeve member 20 outwardly to follow the outward movement of collar 17.

It will be understood that the extent of axial movement of sleeve member 20 and the objective lens will follow that of collar 17. The axial movements of the latter will be determined by the pitch of threads 16, 18.

Generally speaking, the range of adjustment will be encompassed within an angular movement of collar 17 corresponding to something less than one full rotation. Lug 35 will function as a stop engageable with lug 33 to limit the extent of rotation of the collar in both directions.

In accordance with the foregoing, it will be seen that there is provided a simple form of focussing objective which employs a minimum number of parts, and which does not require the provision of slots or other openings in the wall of the scope tube through which moisture and dust might otherwise enter. The drive elements are disposed in the forward external portion of the objective and by providing a simple O-ring seal between the lens cell and the scope tube rearwardly of the drive elements, sealing against the entrance of moisture and dirt is effectively accomplished.

While the illustrated embodiment employs a conically tapered seat ring for spring 36, this is primarily because of the convenient conical shape of tube segment 14. It will be understood that spring 16 may be seated against any suitable shoulder or other abutment in the scope barrel which will provide an effective bearing for the spring.

It will be understood that various modifications and alterations may be made in the details of the illustrative embodiment within the scope of the appended claims but without departing from the spirit of this invention.

What I claim and desire to secure by Letters Patent is:
1. A focussing objective for a telescope sight comprising in combination with a tubular sight barrel:
   (a) an objective lens assembly including sleeve means and lens means mounted in said sleeve means, said sleeve means being slidably mounted in said sight barrel;
   (b) means operative to engage said lens assembly to prevent rotational movement but permit axial movement thereof;
   (c) drive means threadedly connected to a forward end portion of said barrel for rotational and axial movement therealong, a first portion of said drive means being disposed in contact with said lens assembly for driving engagement with the latter when said drive means is moved along said barrel in a first axial direction;
   (d) spring means engaging said lens assembly, said spring means being operative to bias said lens assembly against said first portion of said drive means to cause said lens assembly to follow said drive means when the latter is moved along said barrel in the opposite axial direction;
   (e) one of said sleeve means and said barrel having an annular groove formed therein; and
   (f) annular resilient seal means positioned in said groove and in slidable contact with the other of said sleeve means and said barrel, said seal means being operable to form a relatively movable seal to prevent dust and moisture from entering said barrel between said sleeve means and said barrel.
2. A focussing objective for a telescope sight comprising in combination with a tubular sight barrel:
   (a) sleeve means slidably mounted in said barrel adjacent an inner wall thereof, said sleeve means comprising at least two telescoping ring elements arranged face to face to form an external annular groove between said ring elements;
   (b) objective lens means mounted in said sleeve means;
   (c) non-rotatable means in engagement with said sleeve means and operative to prevent rotational movement of said sleeve means but permit axial movement thereof;
   (d) drive means threadedly connected to a forward end portion of said barrel for rotational and axial movement therealong, a portion of said drive means contacting said sleeve means for driving engagement with the latter when said drive means is moved along said barrel in a first direction;
   (e) spring means in engagement with said sleeve means to bias said sleeve means against said portion of said drive means when the latter is moved along said barrel in the opposite direction; and
   (f) annular seal means disposed in said external annular groove and sandwiched between said sleeve means and an inner wall of said sight barrel, said annular seal means being in sliding contact with said inner wall to form a sliding seal therewith preventing dust and moisture from entering said sight barrel between said sleeve means and said barrel.

3. The focussing objective of claim 2, wherein said annular seal means is a resilient rubber ring.

4. The focussing objective of claim 2, further comprising lug means rigidly connected to said drive means and projecting toward said sleeve means, and stop means formed on said sleeve means and arranged for contact with said lug means to limit in both directions the extent of rotational movement of said drive means.

5. The focussing objective of claim 2, wherein said non-rotatable means is a key disposed in said barrel and positioned within an axially extending groove in said sleeve means.

6. The focussing objective of claim 2, wherein said flexible means comprises a seat ring and a compressed spring interposed between said seat ring and an end wall of said sleeve means.

References Cited

UNITED STATES PATENTS

| | | | |
|---|---|---|---|
| 654,949 | 7/1900 | Common | 350—46 |
| 2,357,326 | 9/1944 | Harris | 350—255 |
| 2,764,061 | 9/1956 | Kinder et al. | 350—252 |
| 3,058,391 | 10/1962 | Leupold | 350—44 |
| 3,351,408 | 11/1967 | Krewalk | 350—252 |

FOREIGN PATENTS

| | | |
|---|---|---|
| 1,130,523 | 10/1956 | France. |
| 1,169,278 | 4/1964 | Germany. |

DAVID SCHONBERG, Primary Examiner

M. J. TOKAR, Assistant Examiner

U.S. Cl. X.R.

350—46